(12) United States Patent
Besling et al.

(10) Patent No.: US 8,622,310 B2
(45) Date of Patent: Jan. 7, 2014

(54) TOKEN COMPRISING IMPROVED PHYSICAL UNCLONABLE FUNCTION

(75) Inventors: Willem Frederik Adrianus Besling, Eindhoven (NL); Jinesh Balakrishna Pillai Kochupurackal, Eindhoven (NL)

(73) Assignee: NXP B.V., Eindhoven (NL)

( * ) Notice: Subject to any disclaimer, the term of this patent is extended or adjusted under 35 U.S.C. 154(b) by 419 days.

(21) Appl. No.: 12/971,492

(22) Filed: Dec. 17, 2010

(65) Prior Publication Data
US 2011/0163088 A1    Jul. 7, 2011

(30) Foreign Application Priority Data
Dec. 17, 2009   (EP) .................................... 09179628

(51) Int. Cl.
*G06F 7/04*    (2006.01)
*G06F 7/58*    (2006.01)
*G06F 21/00*   (2006.01)
*H01G 4/40*    (2006.01)

(52) U.S. Cl.
USPC .............................. 235/492; 361/282; 726/20

(58) Field of Classification Search
USPC ..................... 726/20; 713/185; 235/492, 487; 361/282; 257/532
See application file for complete search history.

(56) References Cited

U.S. PATENT DOCUMENTS

| | | | |
|---|---|---|---|
| 7,242,569 B2 * | 7/2007 | Hunt et al. ..................... | 361/277 |
| 8,129,706 B2 | 3/2012 | Ho et al. | |
| 8,176,106 B2 * | 5/2012 | Schrijen et al. ................ | 708/250 |
| 2008/0112596 A1 * | 5/2008 | Rhoads et al. ................. | 382/115 |
| 2009/0265758 A1 * | 10/2009 | Tuyls ................................. | 726/2 |
| 2009/0282259 A1 * | 11/2009 | Skoric et al. ................... | 713/185 |
| 2012/0106235 A1 * | 5/2012 | Christensen et al. .......... | 365/149 |

FOREIGN PATENT DOCUMENTS

| | | |
|---|---|---|
| CN | 101068039 A | 11/2007 |
| CN | 101326757 A | 12/2008 |
| WO | 2007/069190 A2 | 6/2007 |
| WO | 2008/152577 A1 | 12/2008 |

OTHER PUBLICATIONS

Kursawe, K. et al. "Reconfigurable Physical Unclonable Functions—Enabling Technology for Tamper-Resistant Storage", IEEE International Workshops on Hardward-Oriented Security and Trust (HOST), pp. 22-29 (Jul. 2009).
European Extended Search Report for Patent Appln. No. 09179628.4 (Apr. 29, 2011).

* cited by examiner

*Primary Examiner* — Evan Pert (57) ABSTRACT

The invention relates to a token, to an integrated circuit comprising the token, to a method of randomizing the token and a system for randomizing the token. The token comprises a physical unclonable function and comprising probing means for probing the physical unclonable function. The physical unclonable function comprises a capacitor comprising a dielectric medium being arranged at least partially between the electrodes of the capacitor. The dielectric medium is configured for contributing to a capacitance value of the capacitor and comprises conducting particles substantially randomly dispersed in the dielectric medium. The conducting particles comprise a phase changeable material being changeable between a first structural state having a first conductivity and a second structural state having a second conductivity different from the first conductivity.

15 Claims, 5 Drawing Sheets

TOKEN COMPRISING IMPROVED PHYSICAL UNCLONABLE FUNCTION

This application claims the priority under 35 U.S.C. §119 of European patent application no. 09179628.4, filed on Dec. 17, 2009, the contents of which are incorporated by reference herein.

FIELD OF THE INVENTION

The invention relates to a token comprising an improved physical unclonable function. The invention further relates to an integrated circuit comprising the token, to a method of randomizing the token and a system for randomizing the token. The invention further relates to a computer program product for causing a processor to perform the method of randomizing the token.

BACKGROUND OF THE INVENTION

A token is a physical element which has unique properties which enable the token to be used for identification and authentication purposes, and for the generation of encryption/decryption keys. Such tokens are known in the art and typically comprise a physical object that comprises the unique physical element which enables a probing device to probe the unique physical element and to obtain a unique response from this unique physical element caused by the probing. The unique physical element is also often referred to as the physical unclonable function or physical random function or physical one-way function. This unique response from the physical unclonable function may be used by the probing device to generate a specific bit string which may indicate that the token is authentic. Alternatively, the bit string may be used, for example, to encrypt or decrypt data. Many different examples of physical unclonable functions are known in the art, such as three-dimensional optical media comprising scattering elements which are distributed randomly and which generate a unique scattering distribution when illuminated with, for example, a laser beam.

Physical unclonable functions may also be constituted by a capacitor comprising a dielectric medium arranged between the electrodes of the capacitor, in which the dielectric medium comprises a distribution of conducting particles. Such physical unclonable functions are, for example, known from WO 2007/069190 titled, "On-Chip Estimation of Key-Extraction Parameters for Physical Tokens," of Geert Schrijen et al. (published Jun. 21, 2007). Because both the distribution of the conducting particles in the dielectric medium and the shape of the individual conducting particles are substantially random, the capacitance measured from the capacitor being the physical unclonable function is also substantially random. A benefit when using the physical unclonable function constituted by a capacitor is that it enables the physical unclonable function to be relatively easily embedded in a chip, for example, on a smart card and used, for example, in secure transactions.

A problem with such known physical unclonable functions constituted by a capacitor is that a bandwidth within which the randomness of the capacitance varies is relatively limited.

SUMMARY OF THE INVENTION

It is an object of the invention to provide a token comprising a capacitance based physical unclonable function in which the bandwidth within which the randomness of the capacitance varies is increased.

The invention is defined by the independent claims. The dependent claims define advantageous embodiments.

In a first aspect, the invention relates to a token comprising a physical unclonable function and comprising probing means for probing the physical unclonable function to obtain a unique response in response to the probing, the physical unclonable function comprising a capacitor comprising a dielectric medium being arranged at least partially between the electrodes of the capacitor and being configured for contributing to a capacitance value of the capacitor, the dielectric medium comprising conducting particles substantially randomly dispersed in the dielectric medium, the conducting particles comprising a phase changeable material being changeable between a first structural state having a first conductivity and a second structural state having a second conductivity different from the first conductivity.

As indicated before, a token is a physical element which has unique properties which enable the token to be used for identification and authentication purposes, and for the generation of encryption/decryption keys. The token, also often referred to as security token, hardware token, authentication token, cryptographic token, and software token typically acts as an electronic key and may, for example, be used in addition to or in place of a password to prove that a person is who he claims to be. The unique property may, for example, be a randomized capacitance value of a capacitor integrated in the token. By scanning the capacitor via a read-out circuit, the unique property may be captured and used for identification. Examples of tokens are, for example, a banking card, a smart card, or a device comprising a randomized physical parameter which is specific for the device, or specific for the integrated circuit on the device, or specific for the capacitor read-out circuit.

Phase changeable material is a material which, upon a trigger, may alter its structural state, for example, from a crystalline state into an amorphous state. The phase changeable material is configured for altering the structural state while maintaining dispersed in the dielectric medium. To alter the structural state, the phase changeable material may, for example, be heated to above a threshold temperature causing the phase changeable material to melt. Typically the rate of cooling after having been molten determines the resulting structural state of the phase changeable material. The rate of cooling may strongly vary throughout the dielectric material and typically randomly varies throughout the dielectric material which causes the changing of the phase of the phase changeable material after heating above the threshold temperature to become substantially random within the dielectric medium. Such phase changeable materials, for example, comprise chalcogenide material which is also commonly used in re-writable compact discs (CD) and re-writable digital video discs (DVD). Chalcogenide materials comprise, for example, $Ge_2Sb_2Te_5$ and many other $Ge_kIn_lSb_mTe_n$ combinations, in which k, l, m and n may be in a range between 0 and 100.

The effect of the token according to the invention is that an additional element of complexity is added to the physical unclonable function constituted by a capacitor. Due to the difference in conductivity and due to the changeability of this difference in conductivity, the randomness of the capacitance of the physical unclonable function is substantially enhanced. When heating the phase changeable material to a temperature above the threshold temperature, the subsequent rate of cooling is strongly determined by the surroundings of the conducting particle comprising the phase changeable material. For example, the location of a first conducting particle in the dielectric medium comprises a surrounding of a first conducting particle which may, for example, enhance the cooling speed of the first conducting particle resulting in the phase changeable material in this first conducting particle, after having been through the heating and cooling phases, to end up in an amorphous state which result in a relatively low conductivity. A second conducting particle has different surroundings such that, for example, the thermal energy may not easily flow away from this second conducting particle which results in a reduced cooling speed and consequently in a crystalline state having relatively high conductivity. As the surroundings of the individual conducting particles is almost impossible to actively influence, it becomes substantially unpredictable which of the conducting particles comprising phase changeable materials will change from a crystalline state into an amorphous state and vice versa. As a result of the change of the structural state of the individual conducting particle, the conductivity of this individual particle changes which alters the overall capacitance of the physical unclonable function.

In the known physical unclonable functions based on a capacitor, the capacitance is based only on the randomness of the distribution of the conducting particles dispersed in the dielectric medium between the electrodes of the capacitor. However, the distribution of the particles in the dielectric medium of the known physical unclonable functions is fixed, and because the distribution of the particles in the dielectric medium relates to the capacitance distribution of other three dimensional capacitors on the chip, a smart hacker may find out the capacitance distribution of the chip and may hack the stored data in it. In the physical unclonable function according to the invention the distribution of the conducting particles is substantially random, comparable with the known physical unclonable functions, but on top of that the conductive properties of the individual conducting particles may be altered and this altering of the conductive properties of the individual conducting particles may be performed substantially randomly. After having heated the phase changeable material to above the threshold temperature, the structural state to which the phase changeable material returns is depending strongly on the local surroundings of the individual conducting particles which makes the changing of the phase changeable material substantially unpredictable substantially increasing the randomness of the physical unclonable function and enhancing the security of the physical unclonable function. In addition, because the different phase typically also has different conductive properties, the range over which the capacitance of the capacitor constituting the physical unclonable function varies increases.

In an embodiment of the token, the difference between the first conductivity and the second conductivity is at least one order of magnitude, and/or at least two orders of magnitude, and/or at least three orders of magnitude. When the first conductivity is at least one order of magnitude larger than the second conductivity, the conductivity of the first structural state is at least 10 times ($=10^1$) better than the conductivity of the second structural state. This change in conductivity is relatively limited which requires good measurement techniques and relatively large capacitor to produce a noticeable difference in the dielectric constant of the capacitor. When the first conductivity is at least two orders of magnitude larger than the second conductivity, the conductivity of the first structural state is at least 100 times ($=10^2$) better than the conductivity of the second structural state. This change of at least two orders of magnitude enable the dimensions of the capacitor constituting the physical unclonable function to be reduced while still obtaining a significant change in dielectric constant of the capacitor. When the first conductivity is at least three orders of magnitude larger than the second conductivity, the conductivity of the first structural state is at least 1000 times ($=10^3$) better than the conductivity of the second structural state. This change of at least three orders of magnitude increase the randomness and bandwidth of the capacitor while enabling the dimensions of the capacitor to remain limited. The difference between the first conductivity and second conductivity may result in an overall change of the dielectric constant and as such determines the range within which the capacitance value of the capacitor may vary and consequently determines the range and bandwidth in the randomness which may be expected in the capacitance value of the capacitor. A relatively large bandwidth of randomly defined capacitance values of the capacitor generates a larger range in randomness of the capacitance value in the token and consequently a more secure token.

In an embodiment of the token, the phase changeable material in the first structural state comprises a conductive material and in the second structural state comprises a dielectric material. Phase changeable materials which change from a conductive material into a dielectric material and vice versa have an even higher difference between the first conductivity and the second conductivity than the previously mentioned three orders of magnitude because the dielectric material substantially behaves as an insulator. Such materials are, for example, known as chalcogenide materials used in re-writable compact discs and DVDs. This huge difference in conductivity of the phase changeable material in the first structural state and the second structural state enable a significant increase in randomness and bandwidth of the physical unclonable function, while the capacitor may still be integrated in an integrated circuit. A further effect of the embodiment in which the second structural state comprises a dielectric material is that the dielectric permittivity of the capacitor changes. If the phase changeable material transforms into a non-conducting state (such as the dielectric material) the phase changeable material will behave like an isolator strongly influencing the dielectric permittivity of the capacitor.

In an embodiment of the token, the first structural state is a crystalline state of the phase changeable material, and the second structural state is an amorphous state of the phase changeable material. Such phase changeable material may, for example, be chalcogenide material which is also commonly used in re-writable compact discs (CD) and re-writable digital video discs (DVD). Chalcogens are the chemical elements in group 16 of the periodic table. The term chalcogenide is more commonly reserved for sulfides, selenides, and tellurides, for example, $Ge_2Sb_2Te_5$ and many other $Ge_kIn_lSb_mTe_n$ combinations, in which k, l, m and n may be in a range between 0 and 100. Phase changeable material may, for example, also and alternatively comprise Se. Also materials like AgInSbTe may be suitable as phase changeable material. Also other less common materials such as InSe, SbSe, SbTe, InSbSe, InSbTe, GeSbSe, GeSbTeSe, and AgInSbSeTe may be used.

In an embodiment of the token, the dielectric medium surrounding the conducting particles is configured for allowing the phase changeable material to also change a shape of the phase changeable material when changing from the first structural state to the second structural state and/or vice versa. The dielectric medium may, for example, comprise $Al_2O_3$, $TiO_2$, $SiO_2$, $ZrO_2$, $HfO_2$ particles which will cause the whole dielectric medium to expand and contract during heating and cooling cycle, depending on thermal expansion coefficient of the different materials present in the dielectric medium. This determines the final state which is "freezed-in" when the dielectric medium is cooled. During the heating and cooling some rearrangement of the particles and/or coalescence could take place changing the overall dielectric properties. Moreover, in the matrix there will be always some space/grain boundaries that allow reshaping/restructuring of the phase change materials.

Typically when changing from the crystalline phase to the amorphous phase and/or vice versa, not only the conductivity of the phase changeable material changes but also—if possible—the shape of the particle constituted by the phase changeable material. The electric field which propagates between the electrodes of the capacitor depends very much on the shape of the individual conducting particles dispersed in the dielectric medium. For example, relatively sharp corners of a conducting particle typically comprise a relatively high flux density. Every time the shape of the conducting particles changes, an additional uncertainty and/or randomness in the parasitic capacitance of the capacitor occurs which further enhances the randomness of the capacitance value of the physical unclonable function constituted by the capacitor. Alternatively, the dielectric medium which may comprise a polymer matrix which may be deformable and which may, for example, allow the conducting particles to change their shape or form between the first structural state and the second structural state.

In an embodiment of the token, a protective layer covers the electrodes of the capacitor, the protective layer comprising the dielectric medium. Such a protective layer may, for example, comprise a deformable resist layer having conducting particles dispersed in the resist layer. These conducting particles comprise phase changeable material. The protective layer may be spin coated on the surface comprising the electrodes of the capacitor. In an embodiment of the token also a protective dielectric layer can be applied over the electrodes to avoid large electrical contact between the electrodes if, for example, the metallic/phase change loading is relatively large.

In an embodiment of the token, at least a part of the conducting particles and/or at least a part of the dielectric medium further comprise absorption material configured for absorbing a predefined range of electromagnetic radiation for heating the conducting particles. The absorption material may enhance the heating of the conducting particles and/or of the dielectric medium to more easily heat the conducting particles comprising the phase changing material to a temperature above the threshold temperature causing the phase changeable material in the conducting particles to melt and subsequently, while cooling down, resulting in one of the first or second structural state. The absorption material may be present, for example, in all conducting particles to enhance the local heating of the conducting particles while ensuring that the dielectric medium is not heated too much. Alternatively, the absorption material may only be present in part of the conducting particles which may, for example, be mixed with conducting particles not having the absorption material. This mixture of the two different conducting particles further enhances the randomness in the physical unclonable function of the token. Even further alternatively, the absorption material may be present in the dielectric medium. Furthermore, by adapting and/or controlling the power and/or duration of the irradiation of the capacitor based physical unclonable function with the electromagnetic radiation, a further variation and uncertainty is added to the capacitance of the capacitor based physical unclonable function further improving the randomness of the physical unclonable function and consequently the security of the token.

In an embodiment of the token, at least a part of the conducting particles and/or at least a part of the dielectric medium further comprise heat extraction material configured for enhancing the extraction of heat away from the conducting particles. The presence of heat extraction material may locally change the cooling rate of individual conducting particles in the dielectric medium which greatly alters the final state of the phase change material.

In an embodiment of the token, the conducting particles comprise a size distribution for absorbing a predefined range of electromagnetic radiation for heating the conducting particles. A particle size distribution of the conducting particles comprising the phase change material causes a variation in the absorption of the electromagnetic radiation. For a broad particle size distribution the heating and cooling rates will be different under illumination, physical heating and high current conditions. Moreover small particles tend to coalesce when molten which will increase randomness.

In an embodiment of the token, the token comprises altering means for altering the structural state of at least a part of the conducting particles in the dielectric medium for altering the capacitance value of the capacitor. These altering means may comprise, for example, a heating wire arranged near the dielectric medium for at least heating a part of the dielectric medium, and consequently a part of the conducting particles dispersed in the dielectric medium. These altering means may also comprise means for forcing a relatively high current through the capacitor which causes an electrical breakdown which may modify the structural state of the phase changeable material which changes the overall capacitance. This altering means may be seen as a safety regulation which may, for example, be used as a self-destruct element of the token. When the token is tampered with, for example, extensively probed to find regularities in the particle distribution in the token, the token may activate the altering means to alter the structural state of part of the phase changeable material in part of the conducting particles which results in a different capacitance value of the physical unclonable function. The token, when probed with a probing device to verify its authenticity, will sense a different capacitance and as such will no longer accept the token as authentic. When, for example, the physical unclonable function is part of a bank card, the hacker may try to tamper with the capacitance to unveil its secret and its code to abuse the bank card. The capacitance value together with a code, for example, a bank account number may be the unique combination which enables the owner to access his/her bank account. As soon as the token activate the altering means, the token changes its capacitance which results in a change in the unique combination between the capacitance value and the bank account number, and consequently destroys the authenticity of the token which makes the bank card unusable for the hacker. Consequently, abuse of the bank card is prevented.

In an embodiment of the token, the altering means comprises local heating means for locally increasing the temperature of the at least a part of the conducting particles above a threshold temperature for altering the structural state of the at least a part of the conducting particles. These local heating means may, for example, be positioned above or below the capacitor. Alternatively, a conductive heating line may be arranged in between the combs of a capacitor or the conductive heating line may be constituted of multiple lines to create a random change in the local heating, for example, via randomly choosing a heating line from the multiple lines.

In an embodiment of the token, the altering means comprises means for applying a relatively high current through the capacitor for at least partially causing an electrical breakdown for modifying at least a part of the structural state of the phase changeable material.

In an embodiment of the token, the altering means comprises local cooling means for locally adapting a cooling rate of the conducting particles for altering the structural state of the at least part of the conducting particles. Local cooling means may be constituted by including a Peltier element. Alternatively local cooling means, for instance, metallic or dielectric particles may be added to the dielectric medium which may function as local cooling means which actively that conduct heat. The phase changeable material which is close to these particles will experience a larger, locally enhanced cooling rate than phase changeable material which is not close to these heat conducting.

In a second aspect, the invention relates to an integrated circuit comprising the token according to the invention.

In a third aspect, the invention relates to a method of randomizing a token, the token comprising a physical unclonable function comprising a capacitor comprising a dielectric medium arranged at least partially between the electrodes of the capacitor and being configured for contributing to a capacitance value of the capacitor, the dielectric medium comprising conducting particles substantially randomly dispersed in the dielectric medium, the conducting particles comprising a phase changeable material being changeable between a first structural state having a first conductivity and a second structural state having a second conductivity different from the first conductivity, the method comprising a step of altering the structural state of at least a part of the conducting particles in the dielectric medium for altering the capacitance value of the capacitor. The phase changeable material is configured for altering the structural state of the phase changeable material while maintaining dispersed in the dielectric medium. The change of the phase of a conducting particle changes the conductivity of that specific conducting particle and may also change the dielectric permittivity. Furthermore, whether a particle changes from, for example, a crystalline phase into an amorphous phase depends on the immediate surroundings of the conducting particle which is substantially random.

In an embodiment of the method, the step of altering the structural state of the at least a part of the conducting particles comprises the steps of
  heating the at least part of the conducting particles above a threshold temperature, and
  cooling down the at least part of the conducting particles to below a further threshold temperature to generate the first structural state and/or the second structural state.

The heating may be done such that all conducting particles absorb sufficient heat to heat up to above the threshold temperature or that only a few, for example, the smallest conducting particles heat up to above the threshold temperature. After having been heated, the cooling down may be a forced cooling down to below the further threshold temperature or the cooling threshold temperature in which the heated conducting particles are predominantly changed to an amorphous state. The cooling threshold temperature may be similar than the threshold temperature, but typically is different than the threshold temperature for heating. The cooling threshold temperature is a temperature under which the state of the phase changeable material will not change anymore. Because the direct surroundings of an individual conducting particle determines the cooling speed and consequently the structural state of the individual conducting particle after cooling, it is almost impossible to ensure that all conducting particles in which the temperature exceeded the threshold temperature will end up in the amorphous state further adding to the randomness of the change of capacitance of the capacitor. The conducting particles or a specific part of the conducting particles may, for example, also comprise specific absorption material which may ensure that the conducting particles more easily absorb the heating which may, for example, be applied by providing electromagnetic radiation within a predefined range of electromagnetic radiation to the dielectric medium. Consequently, the heating of the conducting particles may be influenced and the mixture of strongly absorbing conducting particles mixed with less absorbing conducting particles may be used to further enhance the randomness of the token comprising the physical unclonable function. Alternatively the heating of the conducting particles may be influenced by using conducting particles having a specific range of particles size which each require a specific amount of heat before reaching the threshold temperature thus enhancing the randomness of the token. Finally, also the surrounding medium of the conducting particles may be used to influence the heating rate and cooling rate and as such enhance the randomness of the token.

In an embodiment of the method, the step of heating the at least part of the conducting particles comprises applying a condensed beam of electromagnetic radiation to at least a part of the dielectric medium comprising the at least part of the conducting particles. A benefit of this embodiment is that sources for emitting the condensed beam of electromagnetic radiation are readily available and allow a relatively cost-effective way of heating the at least part of the dielectric medium. Furthermore, using, for example, lasers, enable the condensed beam of electromagnetic radiation to be applied locally as the focus of the condensed beam may be made relatively small. As only part of the dielectric medium is illuminated and as it may not be apparent which part is illuminated, the use of the condensed beam of electromagnetic radiation further enhances the randomness of the capacitance value in the capacitor based physical unclonable function.

In an embodiment of the method, the step of heating the at least part of the conducting particles comprises applying a varying condensed beam of electromagnetic radiation to at least a part of the dielectric medium comprising the at least part of the conducting particles. Varying the applied power or varying the time during which the condensed beam of electromagnetic radiation is applied to the dielectric medium may alter the rate of change from the first structural state to the second structural state in the dielectric medium of the capacitor based physical unclonable function, again enhancing the randomness.

In an embodiment of the method, the step of heating the at least part of the conducting particles comprises applying a plurality of condensed beams of electromagnetic radiation, each of the plurality of condensed beams illuminating a corresponding part of the dielectric medium comprising the at least part of the conducting particles, the plurality of condensed beams are applied to the dielectric medium in a randomized pattern of the plurality of condensed beams. Again both the plurality of condensed beams and the applying of the condensed beams in a randomized pattern enhance the randomness of the capacitance value of the capacitor based physical unclonable function. Furthermore, the plurality of condensed beams may, for example, comprise electromagnetic radiation having different wavelengths. For example, part of the conducting particles may comprise absorption material absorbing a first range of electromagnetic radiation and a further part of the conducting particles may comprise a further absorption material absorbing a second range of electromagnetic radiation, different from the first range of electromagnetic radiation. By applying a plurality of condensed beams in which one or some of the condensed beams emit electromagnetic radiation having a different wavelength a further enhancement of the randomness may be achieved.

In an embodiment of the method, the step of heating the at least part of the conducting particles comprises applying a heating current through a heating wire arranged near at least a part of the dielectric medium comprising the at least part of the conducting particles. This embodiment has as an advantage that the heating wire may be applied relatively easily. When using a plurality of heating wires, one or a selection of these heating wires of the plurality of heating wires may be chosen substantially randomly to enhance the randomness of the physical unclonable function.

In an embodiment of the method, the step of heating the at least part of the conducting particles comprises applying a heating current through a mesh of heating wires. In such an embodiment, the selected heating wires in the mesh of heating wires used for applying the heating current may be selected substantially randomly.

In an embodiment of the method, the step of heating the at least part of the conducting particles comprises applying a relatively high current through the capacitor for at least partially causing an electrical breakdown for modifying at least a part of the structural state of the phase changeable material. The applying of the relatively high electrical current changes the state of the phase changeable material which is the basic principle of the phase change memory SET and RESET cycle used in re-writable CD or DVD. In the current embodiment of the method, the electrical current will flow substantially only at locations where the crystalline phase changeable material particles touch and where the remaining dielectric material in between the capacitor electrodes is so small that electrical breakdown occurs. The phase changeable material around the current path will get heated and a randomized change in capacitance will occur.

In an embodiment of the method, the step of cooling down the at least part of the conducting particles comprises applying forced cooling means for increasing the cooling speed of the at least part of the dielectric medium comprising the at least part of the conducting particles. The forced cooling down may cause the heated conducting particles to be predominantly changed to, for example, the amorphous structural state. However, because the direct surroundings of an individual conducting particle determines the cooling speed and consequently the structural state of the individual conducting particle after cooling, it is almost impossible to ensure that all conducting particles in which the temperature exceeded the threshold temperature will end up in the amorphous state further adding to the randomness of the change of capacitance of the capacitor. Still, using this forced cooling down may shift the range of possible capacitance values within the total range of possible capacitance values allowing to use the full range of possible capacitance values of the capacitor based physical unclonable function. Distributing heat conducting particles in the dielectric medium may further enhance the forced cooling of the at least part of the conducting particles. Applying such heat conducting particles in a substantially random distribution further enhances the randomness of the token.

In an embodiment of the method, the step of cooling down the at least part of the conducting particles comprises applying forced cooling means in a substantially randomized pattern for enhancing the cooling of the corresponding part of the dielectric medium comprising the at least part of the conducting particles. Local forced cooling means may, for example, comprise a Peltier element, for example, arranged in a pattern of Peltier elements which allow local applying of forced cooling of the conducting particles. Alternatively, the dielectric medium may be in thermal contact with conducting elements connected to a heat sink for extracting thermal energy from the corresponding parts of the dielectric medium which are in contact with the conducting elements. The conducting elements may be arranged in a specific distribution which may be substantially random, also enhancing the randomness via the cooling of the at least part of the conducting particles.

In a fourth aspect, the invention relates to a system for randomizing a token, the token comprising a physical unclonable function comprising a capacitor comprising a dielectric medium arranged at least partially between the electrodes of the capacitor and being configured for contributing to a capacitance value of the capacitor, the dielectric medium comprising conducting particles substantially randomly dispersed in the dielectric medium, the conducting particles comprising phase changeable material being changeable between a first structural state having a first conductivity and a second structural state having a second conductivity different from the first conductivity, the system comprising randomizing means for altering the structural state of at least a part of the conducting particles in the dielectric medium for altering the capacitance value of the capacitor.

In an embodiment of the system, the randomizing means comprises heating means for heating the at least part of the conducting particles above a threshold temperature, the heating means comprising emitting means for emitting a condensed beam of electromagnetic radiation to at least a part of the dielectric medium comprising the at least part of the conducting particles.

In an embodiment of the system, the randomizing means comprises heating means for heating the at least part of the conducting particles above a threshold temperature, the heating means comprising emitting means for emitting a plurality of condensed beams of electromagnetic radiation, each of the plurality of condensed beams illuminating a corresponding part of the dielectric medium comprising the at least part of the conducting particles. The plurality of condensed beams may comprise condensed beams emitting electromagnetic radiation having a different wavelength compared to the remaining condensed beams in the plurality of condensed beams.

In an embodiment of the system, the randomizing means comprises heating means for heating the at least part of the conducting particles above a threshold temperature, the heating means comprising emitting means for emitting a plurality of condensed beams of electromagnetic radiation, each of the plurality of condensed beams illuminating a corresponding part of the dielectric medium comprising the at least part of the conducting particles, the emitting means being configured for applying the plurality of condensed beams in a randomized pattern of the plurality of condensed beams. By applying the plurality of condensed beams in a randomized pattern, the capacitance value of the capacitor based physical unclonable function is further enhanced. The plurality of condensed beams may comprise condensed beams emitting electromagnetic radiation having a different wavelength compared to the remaining condensed beams in the plurality of condensed beams.

In an embodiment of the system, the randomizing means comprises heating means for heating the at least part of the conducting particles above a threshold temperature, the heating means comprising a heating wire arranged near at least a part of the dielectric medium comprising the at least part of the conducting particles. The heating wire may be part of the token in which the system may, for example, provide power to the heating wire to ensure that the at least part of the dielectric medium is heated.

In an embodiment of the system, the randomizing means comprises heating means for heating the at least part of the conducting particles above a threshold temperature, the heating means comprising a mesh of heating wires. In such an embodiment, the selected heating wires in the mesh of heating wires used for applying the heating current may be selected substantially randomly.

In an embodiment of the system, the randomizing means further comprises cooling means for cooling the heated part of the conducting particles to below the further threshold temperature, the cooling means comprising a Peltier element for applying forced cooling to increase the cooling speed of the at least part of the dielectric medium comprising the at least part of the conducting particles. The benefit when using a Peltier element is that the cooling may be easily electronically controlled and may even be controlled to vary substantially randomly.

In an embodiment of the system, the randomizing means further comprises cooling means for cooling the heated part of the conducting particles to below the threshold temperature, the cooling means comprising a pattern of selectable Peltier elements for applying forced cooling. The pattern of selectable Peltier elements may be chosen substantially randomly to a substantially randomized pattern of corresponding parts of the dielectric medium to increase the cooling speed of the corresponding parts of the dielectric medium comprising the at least part of the conducting particles.

In an embodiment of the system, the randomizing means further comprises cooling means for cooling the heated part of the conducting particles to below the threshold temperature, the cooling means comprising a heat sink for applying forced cooling to increase the cooling speed of the at least part of the dielectric medium comprising the at least part of the cooling particles. Together with, for example, a distribution of heat conducting particles in the dielectric medium the forced cooling of the at least part of the conducting particles may be further enhanced. Applying such heat conducting particles in a substantially random distribution further enhances the randomness of the token.

In an embodiment of the system, the randomizing means further comprises cooling means for cooling the heated part of the conducting particles to below the threshold temperature, the cooling means comprising a pattern of conducting elements in thermal contact with corresponding parts of the dielectric medium and with the heat-sink for extracting thermal energy from the corresponding parts of the dielectric medium for influencing the localized forced cooling.

In a fifth aspect, the invention relates to a computer program product comprising instructions for causing a processor to perform the method in accordance with the invention.

These and other aspects of the invention are apparent from and will be elucidated with reference to the embodiments described hereinafter.

LIST OF REFERENCE NUMERALS

| | |
|---|---|
| 10, 12, 14, 16, 18 | Embodiments of the physical unclonable function |
| 20, 22 | Capacitor |
| 20A, 20C; 22A, 22C | Electrodes |
| 30, 32 | Dielectric medium |
| 40, 42; 40A, 40B, 40C | Conducting particles |
| 40A, 40C | First structural state |
| 40B | Second structural state |
| 50 | Absorption material |
| 100 | Token according to the invention |
| 110 | Probing means |
| 120 | Local heating means |
| 200 | Integrated circuit |
| 300 | Smart card |
| 500, 502 | System for randomizing a token according to the invention |
| 510, 511, 512 | Condensed beam of electromagnetic radiation |
| 520 | Heating wire |
| 525 | Mesh of heating wires |
| 530 | Cooling means/heat sink |
| 535 | Cooling means/Peltier element |
| 540 | Means for emitting a condensed beam |
| 550 | Controller |
| $T_{th}$ | Threshold temperature |
| $T_{fth}$ | Further threshold temperature |

DETAILED DESCRIPTION

FIGS. 1A to 1D are different embodiments of a physical unclonable function 10, 12, 14, 16 according to the invention. The physical unclonable function 10, 12, 14, 16, comprises a capacitor 20 which comprises a dielectric medium 30, 32 which is at least partially arranged between electrodes 20A, 20C of the capacitor 20. The dielectric medium 30, 32 contributes to a capacitance value of the capacitor 20. The dielectric medium 30, 32 comprises conducting particles 40, 42; 40A, 40B, 40C which are substantially randomly dispersed in the dielectric medium 30, 32. The conducting particles 40, 42; 40A, 40B, 40C comprise a phase changeable material which is changeable between a first structural state 40A, 40C having a first conductivity and a second structural state 40B having a second conductivity different from the first conductivity.

The effect of the physical unclonable function 10, 12, 14, 16 in a token 100 (see FIG. 2) according to the invention is that an additional element of complexity is added to the physical unclonable function 10, 12, 14, 16 constituted by the capacitor 20 which enhances the randomness of the capacitance of the physical unclonable function 10, 12, 14, 16. When heating the phase changeable material to a temperature above the threshold temperature Tth, the subsequent rate of cooling is strongly determined by the surroundings of the conducting particle 40, 42; 40A, 40B, 40C comprising the phase changeable material. As the surroundings of the individual conducting particles 40, 42; 40A, 40B, 40C is almost impossible to actively influence, it becomes substantially unpredictable which of the phase changeable material in the conducting particles 40, 42; 40A, 40B, 40C will change from a crystalline state into an amorphous state and vice versa. As a result of the change of the structural state of the individual conducting particle 40, 42; 40A, 40B, 40C, the conductivity of this individual particle changes which alters the overall capacitance of the physical unclonable function 10, 12, 14, 16.

Figure 1A:
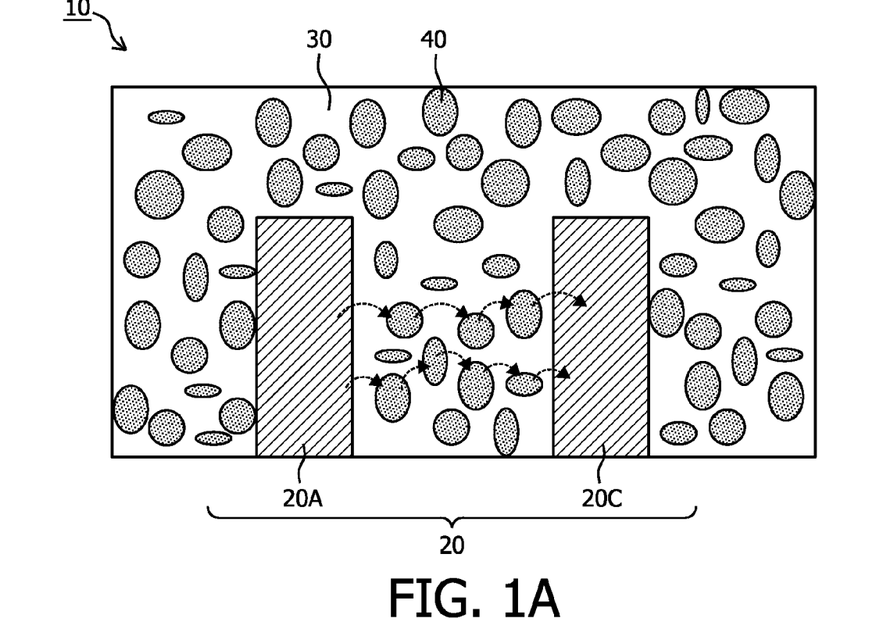
FIGS. 1A to 1D are different embodiments of a physical unclonable function according to the invention.
Figure 1B:
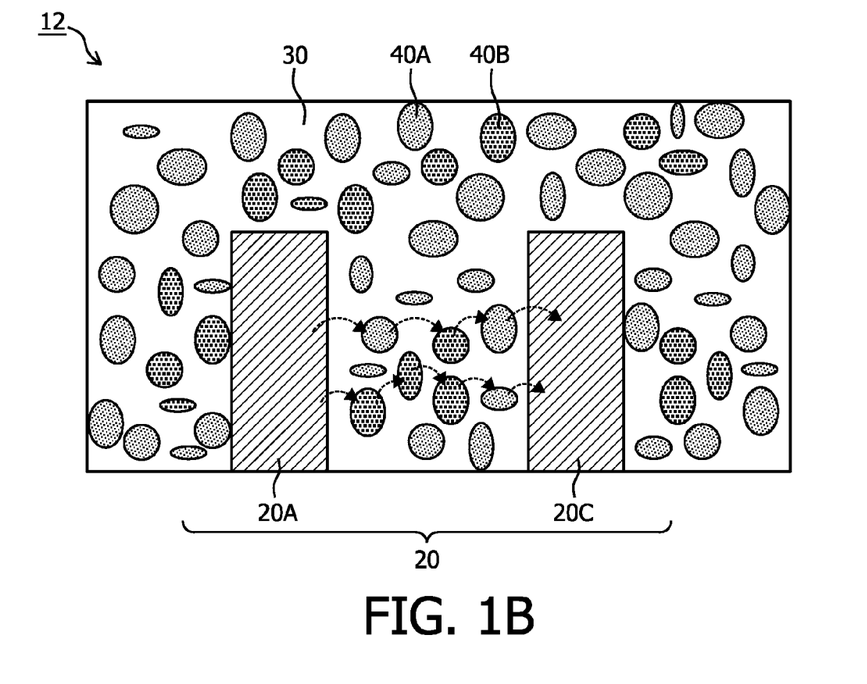

In FIG. 1A a first embodiment of the physical unclonable function 10 is shown in which two conductors 20A, 20C form the electrodes 20A, 20B of a capacitor 20. The dielectric medium 30 surrounding the two electrodes 20A, 20B determines the capacitance value of the capacitor 20. In the schematic arrangement of FIG. 1A, only part of the electrodes 20A, 20B is shown and the capacitor may be constituted by electrodes 20A, 20B having any possible shape, even having a specific three-dimensional shape. The dielectric medium 30 contributes to the capacitance value of the capacitor. The dielectric medium comprises conducting particles 40 comprising the phase changeable material. The phase changeable material comprises, for example, the first structural state which is a crystalline state of the phase changeable material, and the second structural state which is an amorphous state of the phase changeable material. Such phase changeable material may, for example, be chalcogenide material which is also commonly used in re-writable compact discs (CD) and re-writable digital video discs (DVD). Chalcogens are the chemical elements in group 16 of the periodic table. The term chalcogenide is more commonly reserved for sulfides, selenides, and tellurides, for example, Ge2Sb2Te5 and many other GekInlSbmTen combinations, in which k, l, m and n may be in a range between 0 and 100. Phase changeable material may, for example, also and alternatively comprise Se. Also materials like AgInSbTe may be suitable as phase changeable material. Also other less common materials such as InSe, SbSe, SbTe, InSbSe, InSbTe, GeSbSe, GeSbTeSe, and AgInSbSeTe may be used. In FIG. 1A the dashed arrows indicate a possible path between the electrodes 20A, 20B of the capacitor 20. By altering the conductive characteristics of the conducting particles 40, the possible path between the electrodes 20A, 20B may be adapted which alters the capacitance value of the capacitor 20. This is illustrated in FIG. 1B in which a part of the phase changeable material in the conducting particles 40 comprises a first structural state 40A and a part of the phase changeable material in the conducting particles comprise a second structural state 40B. The first structural state 40A is, for example, a crystalline state 40A of the phase changeable material having a relatively high conductivity. The second structural state 40B is, for example, an amorphous state 40B of the phase changeable material having a relatively low conductivity. The rate of cooling of the individual conducting particles 40A, 40B determines in which structural state the individual conducting particles 40A, 40B are freezed-in after having been heated above the threshold temperature Tth. This rate of cooling is, for example, determined by the immediate surroundings of the individual conducting particles 40A, 40B which is substantially random. As such, the change of the structural state of the individual conducting particles 40A, 40B after having been heated above the threshold temperature Tth is also substantially random.

Figure 1C:
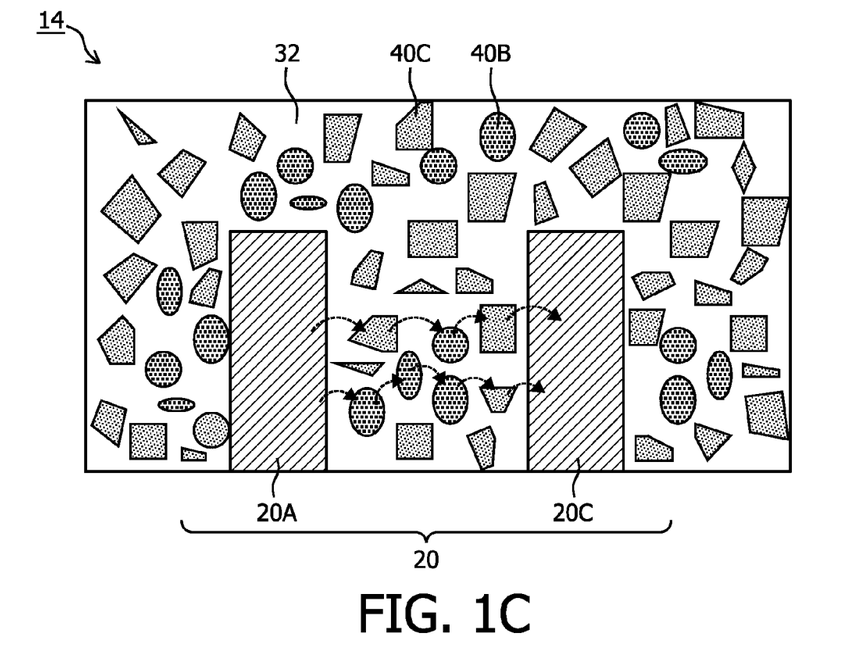

FIG. 1C is an embodiment of the physical unclonable function 14 in which the dielectric medium 32 surrounding the conducting particles 40B, 40C is configured for allowing the phase changeable material to also change a shape of the phase changeable material when changing from the first structural state to the second structural state and/or vice versa. The dielectric medium 32 may, for example, comprise Al2O3, TiO2, SiO2, ZrO2, HfO2 particles which will cause the dielectric medium 32 to expand and contract during heating and cooling cycle, depending on thermal expansion coefficient of the different materials present in the dielectric medium 32. This heating and cooling cycle not only determines the final structural state of the conducting particles 40B, 40C, but also the specific shape of the phase changeable material and as such the specific shape of the conducting particle 40C which is "freezed-in" when the dielectric medium 32 is cooled. During the heating and cooling some rearrangement of the particles 40B, 40C and/or coalescence could take place changing the overall dielectric properties. Also some of the present space/grain boundaries may allow reshaping and/or restructuring of the phase change material in the conducting particles 40B, 40C. In FIG. 1C the conducting particles 40B indicated with reference number 40B are indicated to have an amorphous structural state, which the conducting particles 40C indicated with reference number 40C are indicated to have a crystalline structural state. As indicated with the dashed arrows, the changing of the structure and/or shape of the conducting particles 40C in the dielectric medium 32 changes the path between the two electrodes 20A, 20B which subsequently change the capacitance value of the capacitor 20. For example, relatively sharp corners of a conducting particle 40C typically comprise a relatively high flux density. Every time the shape of the conducting particles 40B, 40C changes, an additional uncertainty and/or randomness in the parasitic capacitance value of the capacitor 20 occurs which further enhances the randomness of the capacitance value of the physical unclonable function 14 constituted by the capacitor 20., the The dielectric medium may alternatively comprise a polymer matrix 32 which may be deformable and which may, for example, allow the conducting particles 40B, 40C to change their shape or form between the first structural state and the second structural state.

Figure 1D:
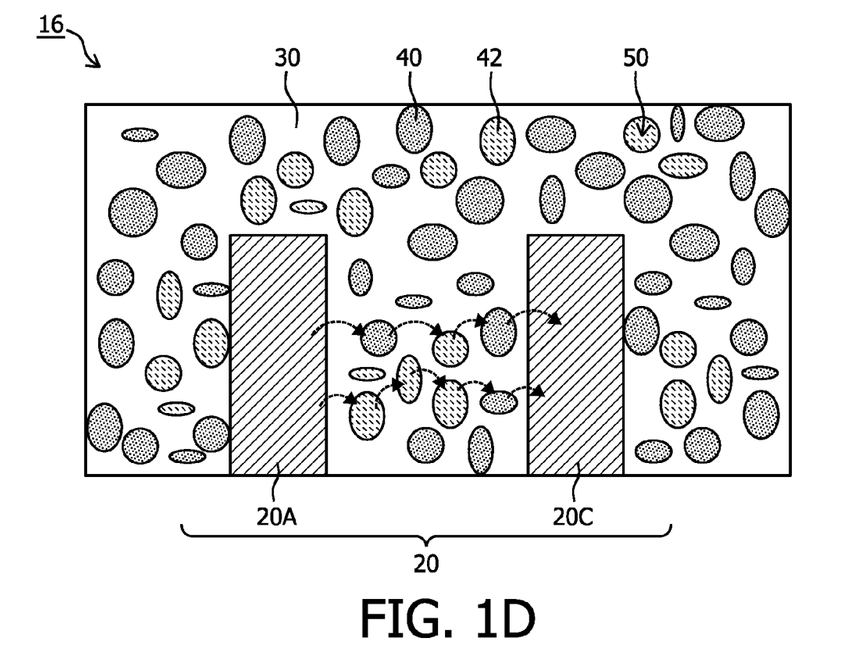

FIG. 1D is an embodiment of the physical unclonable function 16 in which the dielectric medium 30 comprises absorption material 50 (not shown) and/or in which at least a part of the conducting particles comprise absorption material 50. The absorption material 50 may be mixed in the material constituting the conducting particles 42 and/or the absorption material 50 may be applied as a layer at the outer surface of the conducting particles 42. The absorption material 50 is configured for absorbing a predefined range of electromagnetic radiation for heating the conducting particles 42. The absorption material 50 may be used to locally enhance the heating of the conducting particles 42 and/or of the dielectric medium 30 to more easily heat the conducting particles 42 comprising the phase changing material to a temperature above the threshold temperature Tth causing the phase changeable material in the conducting particles 42 to melt and subsequently, while cooling down, resulting in one of the first or second structural state. The embodiment of FIG. 1D comprises a first type of conducting particles 40 not comprising the absorption material 50 and comprises a second type of conducting particles 42 which do comprise the absorption material 50. By mixing the first type of conducting particles 40 and second type of conducting particles 42 the mixture of the two different conducting particles further enhances the randomness in the physical unclonable function 16 of the token.

Alternatively, the dielectric medium 30 may further comprise heat extraction material (not shown) configured for enhancing the extraction of heat away from the conducting particles 40, 42. The presence of heat extraction material may locally change the cooling rate of individual conducting particles 40, 42 in the dielectric medium 30 which greatly alters the final state of the phase change material.

In the embodiment shown in FIG. 1D the conducting particles 40, 42 further comprise a size distribution. This size distribution of the conducting particles 40, 42 also results in a predefined absorption range of electromagnetic radiation for heating the conducting particles 40, 42. A particle size distribution of the conducting particles 40, 42 which comprise the phase change material causes a variation in the absorption of the electromagnetic radiation of the individual conducting particles 40, 42. For example, particles having, for example, a maximum dimension may not absorb sufficient heating energy to achieve the threshold temperature Tth when a predefined amount of heat is applied to the dielectric medium 30. So for a specific particle size distribution the heating and cooling rates will be different depending on the particle sizes of the individual conducting particles 40, 42 and the particle sizes of the surrounding conducting particles 40, 42. A further effect enhancing the randomness of the size distribution is that relatively small conducting particles 40, 42 tend to coalesce when molten which will increase randomness.

Figure 2:
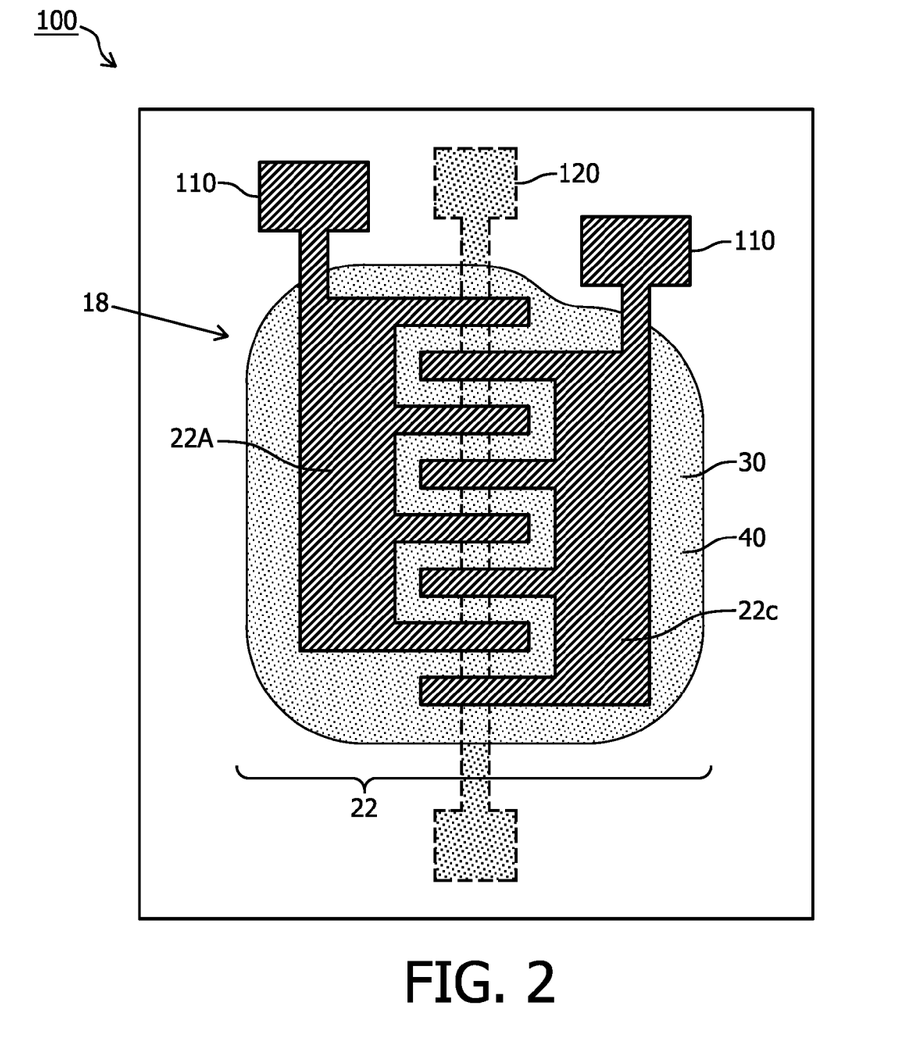
FIG. 2 is a simplified representation of a token according to the invention.

FIG. 2 is a simplified representation of a token 100 according to the invention. The token 100 comprises the physical unclonable function 18 according to the invention comprising the capacitor 22 having two electrodes 22A, 22C which both have a comb-like structure arranged opposite to each other. This comb-like structure enhances the interaction surface between the two electrodes 22A, 22C which enhance the capacitance value of the capacitor 22. Dielectric medium 30 may be applied over the two electrodes 22A, 22C which are spaced apart. Part of the dielectric medium 30 will be positioned between the electrodes 22A, 22C to determine the capacitance value of the capacitor 22. The token 100 further comprises probing means 110 being contact pads which may be used by a sensing device to sense the capacitance value of the capacitor 22 constituting the physical unclonable function 18.

In the embodiment of the token 100 shown in FIG. 2, the token 100 comprises altering means 120 for altering the structural state of at least a part of the conducting particles 40 in the dielectric medium 40 for altering the capacitance value of the capacitor 22. The altering means 120 as shown in FIG. 2 comprises a heating wire 120 arranged near the dielectric medium 30 for at least heating a part of the dielectric medium 30. Consequently a part of the conducting particles 40 dispersed in the dielectric medium 30 will be heated to, for example, above the threshold temperature Tth which enables the heated conducting particles 40 to alter its structural state, depending on the local cooling rate in the dielectric medium 30.

Alternatively, a conductive heating line 120 may be arranged in between the combs 22A, 22C of the capacitor 22 or the conductive heating line may be constituted of multiple lines (not shown) to create a random change in the local heating, for example, via randomly choosing a heating line from the multiple lines. Further alternatively, the altering means 120 may comprise means for forcing a relatively high current through the capacitor 22 (not shown) which may cause a partial electrical breakdown which may modify the structural state of the phase changeable material which changes the overall capacitance value of the capacitor 22. Even further alternatively, the altering means 120 may comprise local cooling means for locally adapting a cooling rate of the conducting particles for altering the structural state of the at least part of the conducting particles.

The altering means 120 may be used as a safety regulation which may, for example, be used as a self-destruct element of the token 100. When the token 100 is tampered with, for example, extensively probed to find regularities in the particle distribution in the token 100, the token 100 may activate the altering means 120 to alter the structural state of part of the phase changeable material in part of the conducting particles 40 which results in a different capacitance value of the physical unclonable function 18. The token 100, when probed with a probing device to verify its authenticity, will sense a different capacitance and as such will no longer accept the token 100 as authentic. When, for example, the physical unclonable function 100 is part of a bank card 300 (see FIG. 3), a hacker may try to tamper with the capacitance 22 to unveil its secret and its code to abuse the bank card 300. The capacitance value together with a code, for example, a bank account number may be the unique combination which enables the owner to access his/her bank account. As soon as the token 100 activates the altering means 120, the token 100 changes its capacitance value of the physical unclonable function 18 which results in a change in the unique combination between the capacitance value and the bank account number, and consequently destroys the authenticity of the token 100 which makes the bank card 300 unusable for the hacker. Consequently, abuse of the bank card 300 may be prevented.

Figure 3:
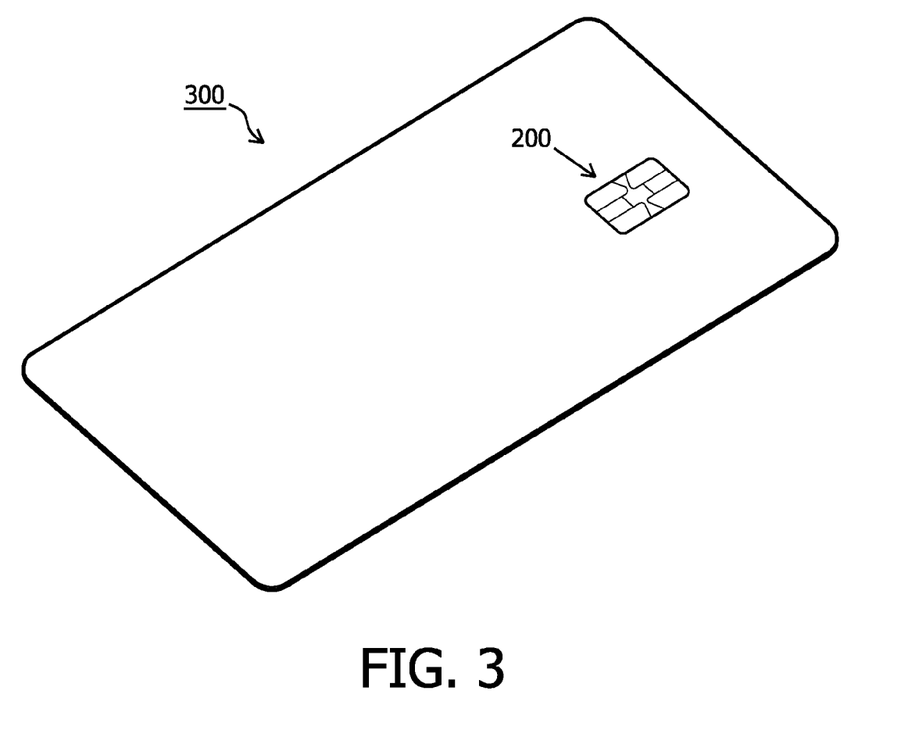
FIG. 3 is a plan-view of a smart card comprising an integrated circuit which comprises the token according to the invention.

FIG. 3 is a plan-view of a smart card 300 or banking card 300 comprising an integrated circuit 200 which comprises the token 100 according to the invention.

Figure 4A:
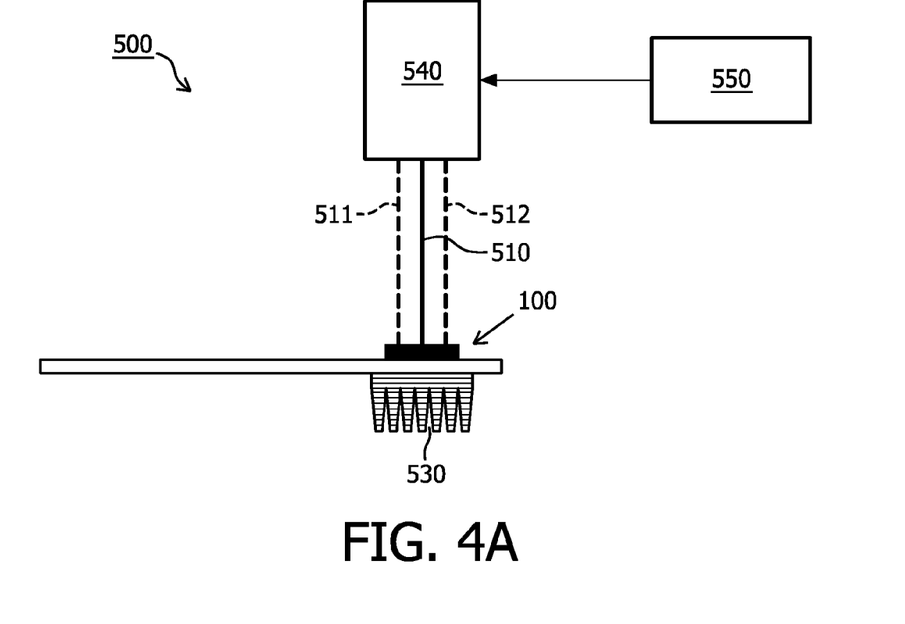
FIGS. 4A and 4B are cross-sectional views of different embodiments of a system for randomizing a token according to the invention.
Figure 4B:
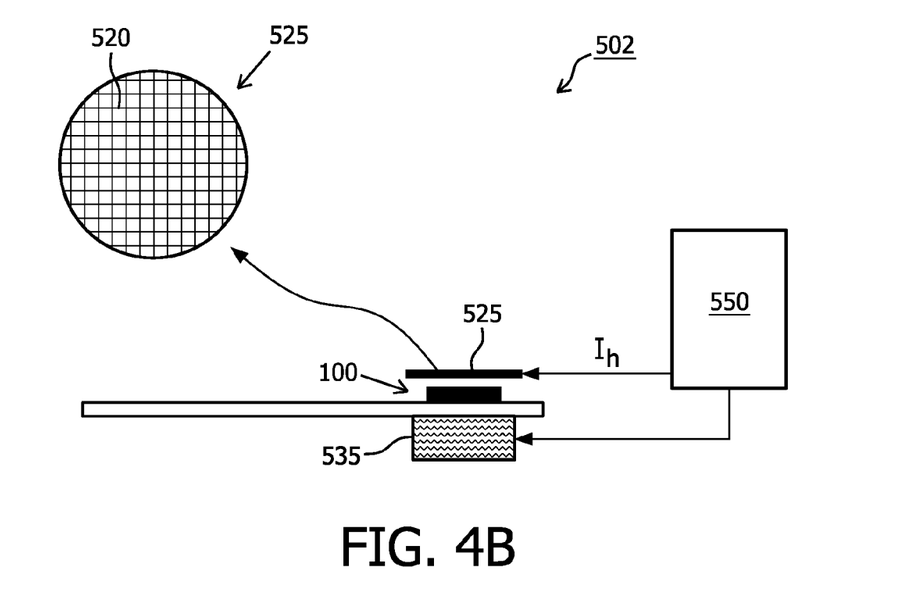

FIGS. 4A and 4B are cross-sectional views of different embodiments of a system 500, 502 for randomizing a token 100 according to the invention. The system 500, 502 for randomizing the token 100 comprises randomizing means 520, 525, 530, 535, 540 for altering the structural state of at least a part of the conducting particles 40, 42; 40A, 40B, 40C (see FIGS. 1A to 1D) in the dielectric medium 30, 32 for altering the capacitance value of the capacitor 20, 22. The randomizing means 520, 525, 530, 535, 540 may comprise heating means 520, 525, 540 for (possibly selectively via absorption material 50—see FIG. 1D) increasing the local temperature of the conducting particles 40, 42; 40A, 40B, 40C above the threshold temperature $T_{th}$, or may comprise cooling means 530, 535 for cooling the local temperature of the heated conducting particles 40, 42; 40A, 40B, 40C to below the further threshold temperature $T_{fth}$. The further threshold temperature $T_{fth}$ may be equal to the threshold temperature $T_{th}$, but typically is different. The system 500, 502 may further comprise a controller 550 for controlling the randomization of the token 100. The controller 550 may drive the heating means 520, 523, 540 and/or the cooling means 530, 535.

In FIG. 4A the heating means 540 comprises means 540 for emitting a condensed beam 510, 511, 512 of electromagnetic radiation to at least a part of the dielectric medium 30, 32 comprising the at least part of the conducting particles 40, 42; 40A, 40B, 40C. The heating means 540 may comprise a Laser or a laser-diode or may comprise another light source which generates a condensed beam of electromagnetic radiation. In the embodiment of FIG. 4A the Laser 540 emits a plurality of condensed beams 510, 511, 512 of electromagnetic radiation, each of the plurality of condensed beams 510, 511, 512 illuminating a different part of the dielectric medium 30, 32 comprising the at least part of the conducting particles 40, 42; 40A, 40B, 40C. The plurality of condensed beams 510, 511, 512 may comprise condensed beams emitting electromagnetic radiation having a different wavelength compared to the remaining condensed beams 510, 511, 512 in the plurality of condensed beams. The plurality of condensed beams 510, 511, 512 may be applied in a randomized pattern of the plurality of condensed beams 510, 511, 512 further enhancing the randomness of the physical unclonable function 10, 12, 14, 16, 18 in the token 100.

The cooling means 530 as shown in FIG. 4A comprise a heat sink 530 for applying forced cooling to increase the cooling speed of the at least part of the dielectric medium 30, 32 comprising the at least part of the conducting particles 40, 42; 40A, 40B, 40C. An additional flow of cooling fluid (not shown) may be applied to further enhance the forced cooling of the heat sink 530. This additional flow of cooling fluid may be generated via a fan (not shown) which is controlled by the controller 550. Together with, for example, a distribution of heat conducting particles in the dielectric medium 30, 32 the forced cooling of the at least part of the conducting particles 40, 42; 40A, 40B, 40C may be further enhance. Applying such heat conducting particles in a substantially random distribution further enhances the randomness of the token 100. The heat sink 530 may further comprise a pattern of conducting elements (not shown) which form a thermal conductive path between corresponding parts of the dielectric medium 30, 32 and the heat-sink 530 for extracting thermal energy mainly from the corresponding parts of the dielectric medium 30, 32 for influencing the localized forced cooling.

In FIG. 4B the heating means comprising a heating wire 520 arranged near at least a part of the dielectric medium 30, 32 comprising the at least part of the conducting particles 40, 42; 40A, 40B, 40C. The heating wire 120, 520 may be part of the token 100 (as shown in FIG. 2) in which the system 500 may, for example, be configured for contacting the heating wire 120, 520 via the contact pads 110 (see FIG. 2) to provide power to the heating wire 120, 520 to ensure that the at least part of the dielectric medium 30, 32 is heated. The randomizing means 540 may comprise heating means 520, 525 by providing a mesh 525 of heating wires 520. In such an embodiment, the selected heating wires 520 in the mesh 525 of heating wires 520 used for applying the heating current may be selected substantially randomly.

The cooling means 535 as shown in FIG. 4B further comprises cooling means comprising a Peltier element 535 for applying forced cooling to increase the cooling speed of the at least part of the dielectric medium 30, 32 comprising the at least part of the conducting particles 40, 42; 40A, 40B, 40C. The benefit when using a Peltier element is that the cooling may be easily electronically controlled by a controller 550 and may even be controlled to vary substantially randomly. The cooling means 535 may comprise a pattern of selectable Peltier elements (not individually shown) for applying forced cooling. The pattern of selectable Peltier elements 535 may be chosen substantially randomly to a substantially randomized pattern of corresponding parts of the dielectric medium 30, 32 to increase the cooling speed of the corresponding parts of the dielectric medium 30, 32 comprising the at least part of the conducting particles 40, 42; 40A, 40B, 40C.

It should be noted that the above-mentioned embodiments illustrate rather than limit the invention, and that those skilled in the art will be able to design many alternative embodiments without departing from the scope of the appended claims. The different elements of different/several physical unclonable functions may be combined together in a token in which, for example, each different physical unclonable function may react differently/randomly to the randomizing step which further enhances the randomness of the token. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Throughout the Figures, similar or corresponding features are indicated by same reference numerals or labels.

The invention claimed is:

1. A token comprising a physical unclonable function and comprising probing means for probing the physical unclonable function to obtain a unique response in response to the probing,
   the physical unclonable function comprising a capacitor comprising a dielectric medium being arranged at least partially between the electrodes of the capacitor and being configured for contributing to a capacitance value of the capacitor,
   the dielectric medium comprising conducting particles substantially randomly dispersed in the dielectric medium, the conducting particles comprising a phase changeable material being changeable between a first structural state having a first conductivity and a second structural state having a second conductivity different from the first conductivity.

2. The token as claimed in claim 1, wherein the difference between the first conductivity and the second conductivity is at least one order of magnitude, and/or at least two orders of magnitude, and/or at least three orders of magnitude, and/or wherein phase changeable material in the first structural state comprises a conductive material and in the second structural state comprises a dielectric material.

3. The token as claimed in claim 1, wherein the first structural state is a crystalline state of the phase changeable material, and wherein the second structural state is an amorphous state of the phase changeable material.

4. The token as claimed in claim 1, wherein the dielectric medium surrounding the conducting particles is configured for allowing the phase changeable material to change a shape of the phase changeable material when changing from the first structural state to the second structural state and/or vice versa.

5. The token as claimed in claim 1, wherein at least a part of the conducting particles and/or at least a part of the dielectric medium further comprise absorption material configured for absorbing a predefined range of electromagnetic radiation for heating the conducting particles, and/or
   wherein at least a part of the conducting particles and/or at least a part of the dielectric medium further comprise heat extraction material configured for enhancing the extraction of heat away from the conducting particles, and/or
   wherein the conducting particles comprise a size distribution for absorbing a predefined range of electromagnetic radiation for heating the conducting particles.

6. The token as claimed in claim 1, wherein the token comprises altering means for altering the structural state of at least a part of the conducting particles in the dielectric medium for altering the capacitance value of the capacitor.

7. The token as claimed in claim 6, wherein the altering means comprises
   local heating means for locally increasing the temperature of the at least a part of the conducting particles above a threshold temperature (Tth) for altering the structural state of the at least a part of the conducting particles, and/or
   means for applying a relatively high current through the capacitor for at least partially causing an electrical breakdown for modifying at least a part of the structural state of the phase changeable material, and/or
   local cooling means for locally adapting a cooling rate of the conducting particles for altering the structural state of the at least part of the conducting particles.

8. An integrated circuit comprising the token according to claim 1.

9. Method of randomizing a token, the token comprising a physical unclonable function comprising a capacitor comprising a dielectric medium arranged at least partially between the electrodes of the capacitor and being configured for contributing to a capacitance value of the capacitor, the dielectric medium comprising conducting particles substantially randomly dispersed in the dielectric medium, the conducting particles comprising phase changeable materials being changeable between a first structural state having a first conductivity and a second structural state having a second conductivity different from the first conductivity,
   the method comprising a step of altering the structural state of at least a part of the conducting particles in the dielectric medium for altering the capacitance value of the capacitor.

10. Method of randomizing according to claim 9, wherein the step of altering the structural state of the at least a part of the conducting particles comprises the steps of
   heating the at least part of the conducting particles above a threshold temperature ($T_{th}$), and
   cooling down the at least part of the conducting particles to below a further threshold temperature ($T_{fth}$) to generate the first structural state and/or the second structural state.

11. The method of randomizing according to claim 10, wherein the step of heating the at least part of the conducting particles comprises:
   applying a condensed beam of electromagnetic radiation to at least a part of the dielectric medium comprising the at least part of the conducting particles, and/or
   applying a varying condensed beam of electromagnetic radiation to at least a part of the dielectric medium comprising the at least part of the conducting particles, and/or
   applying a plurality of condensed beams of electromagnetic radiation, each of the plurality of condensed beams illuminating a corresponding part of the dielectric medium comprising the at least part of the conducting particles, and/or
   applying a plurality of condensed beams of electromagnetic radiation, each of the plurality of condensed beams illuminating a corresponding part of the dielectric medium comprising the at least part of the conducting particles, the plurality of condensed beams being applied to the dielectric medium in a randomized pattern of the plurality of condensed beams, and/or
   applying a heating current ($I_h$) through a heating wire arranged near at least a part of the dielectric medium comprising the at least part of the conducting particles, and/or
   applying a heating current ($I_h$) through a mesh of heating wires,
   applying a heating current ($I_h$) through a mesh of heating wires, the selected heating wires in the mesh of heating wires used for applying the heating current being selected substantially randomly, and/or
   applying a relatively high current through the capacitor for at least partially causing an electrical breakdown for modifying at least a part of the structural state of the phase changeable material.

12. The method of randomizing according to claim 10, wherein the step of cooling down the at least part of the conducting particles comprises:
   applying forced cooling means for increasing the cooling speed of the at least part of the dielectric medium comprising the at least part of the conducting particles, and/or
   applying forced cooling means in a substantially randomized pattern for enhancing the cooling of the corresponding part of the dielectric medium comprising the at least part of the conducting particles.

13. A system for randomizing a token, the token comprising a physical unclonable function comprising a capacitor comprising a dielectric medium arranged at least partially between the electrodes of the capacitor and being configured for contributing to a capacitance value of the capacitor, the dielectric medium comprising conducting particles substantially randomly dispersed in the dielectric medium, the conducting particles comprising phase changeable material being changeable between a first structural state having a first conductivity and a second structural state having a second conductivity different from the first conductivity,
   the system comprising randomizing means for altering the structural state of at least a part of the conducting particles in the dielectric medium for altering the capacitance value of the capacitor.

14. The system for randomizing according to claim 13, wherein the randomizing means comprises heating means for heating the at least part of the conducting particles above a threshold temperature ($T_{th}$), the heating means comprising:
   emitting means for emitting a condensed beam of electromagnetic radiation to at least a part of the dielectric medium comprising the at least part of the conducting particles, and/or
   emitting means for emitting a plurality of condensed beams of electromagnetic radiation, each of the plurality of condensed beams illuminating a corresponding part of the dielectric medium comprising the at least part of the conducting particles, and/or
   emitting means for emitting a plurality of condensed beams of electromagnetic radiation, each of the plurality of condensed beams illuminating a corresponding part of the dielectric medium comprising the at least part of the conducting particles, the emitting means being configured for applying the plurality of condensed beams in a randomized pattern of the plurality of condensed beams, and/or
   a heating wire arranged near at least a part of the dielectric medium comprising the at least part of the conducting particles, and/or
   a mesh of heating wires, and/or
   a mesh of heating wires, the selected heating wires in the mesh of heating wires used for applying the heating current ($I_{th}$) being selected substantially randomly.

15. The system for randomizing according to claim 14, wherein the randomizing means further comprises cooling means for cooling the heated part of the conducting particles to below the further threshold temperature ($T_{fth}$) the cooling means comprising:
   a Peltier element for applying forced cooling to increase the cooling speed of the at least part of the dielectric medium comprising the at least part of the conducting particles, and/or
   a pattern of selectable Peltier elements for applying forced cooling, and/or
   a pattern of selectable Peltier element being substantially randomly selectable to apply forced cooling to a substantially randomized pattern of corresponding parts of the dielectric medium to increase the cooling speed of the corresponding parts of the dielectric medium comprising the at least part of the conducting particles, and/or a heat sink for applying forced cooling to increase the cooling speed of the at least part of the dielectric medium comprising the at least part of the cooling particles, and/or a pattern of conducting elements in thermal contact with corresponding parts of the dielectric medium and with the heat-sink for extracting thermal energy from the corresponding parts of the dielectric medium for influencing the localized forced cooling.

* * * * *